United States Patent Office 3,093,779
Patented June 11, 1963

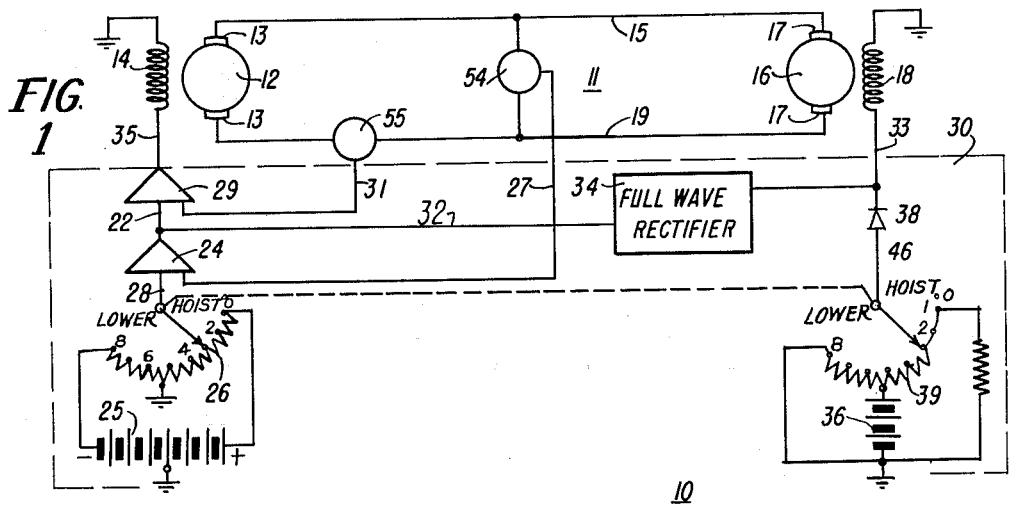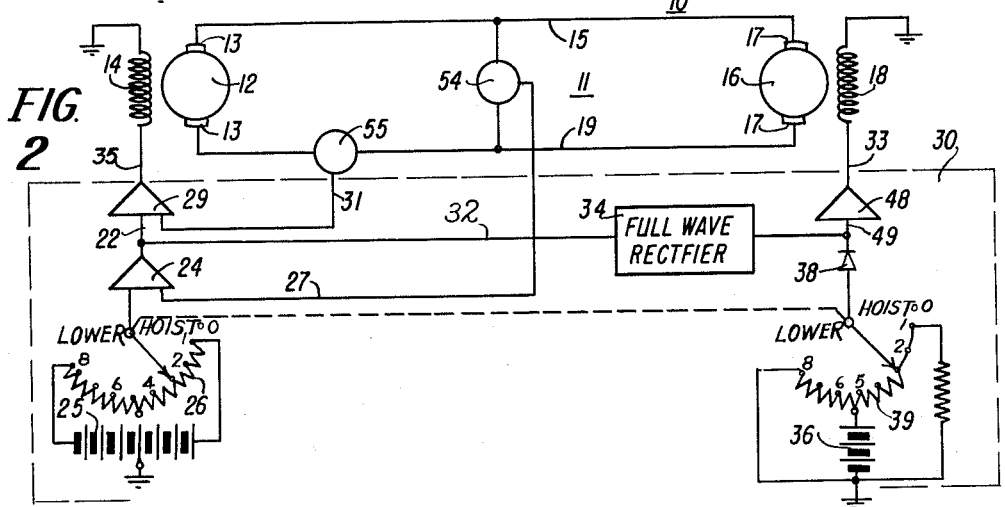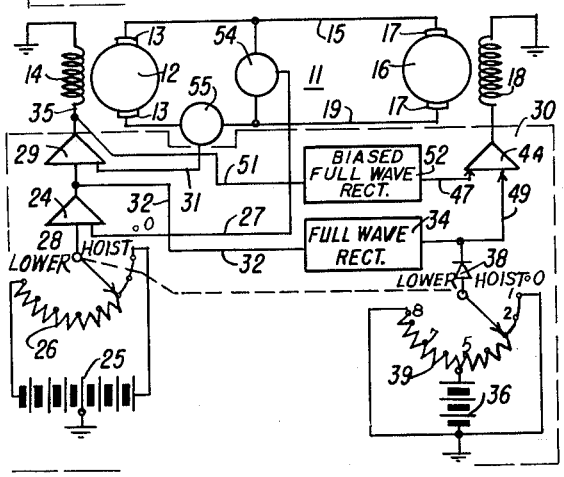

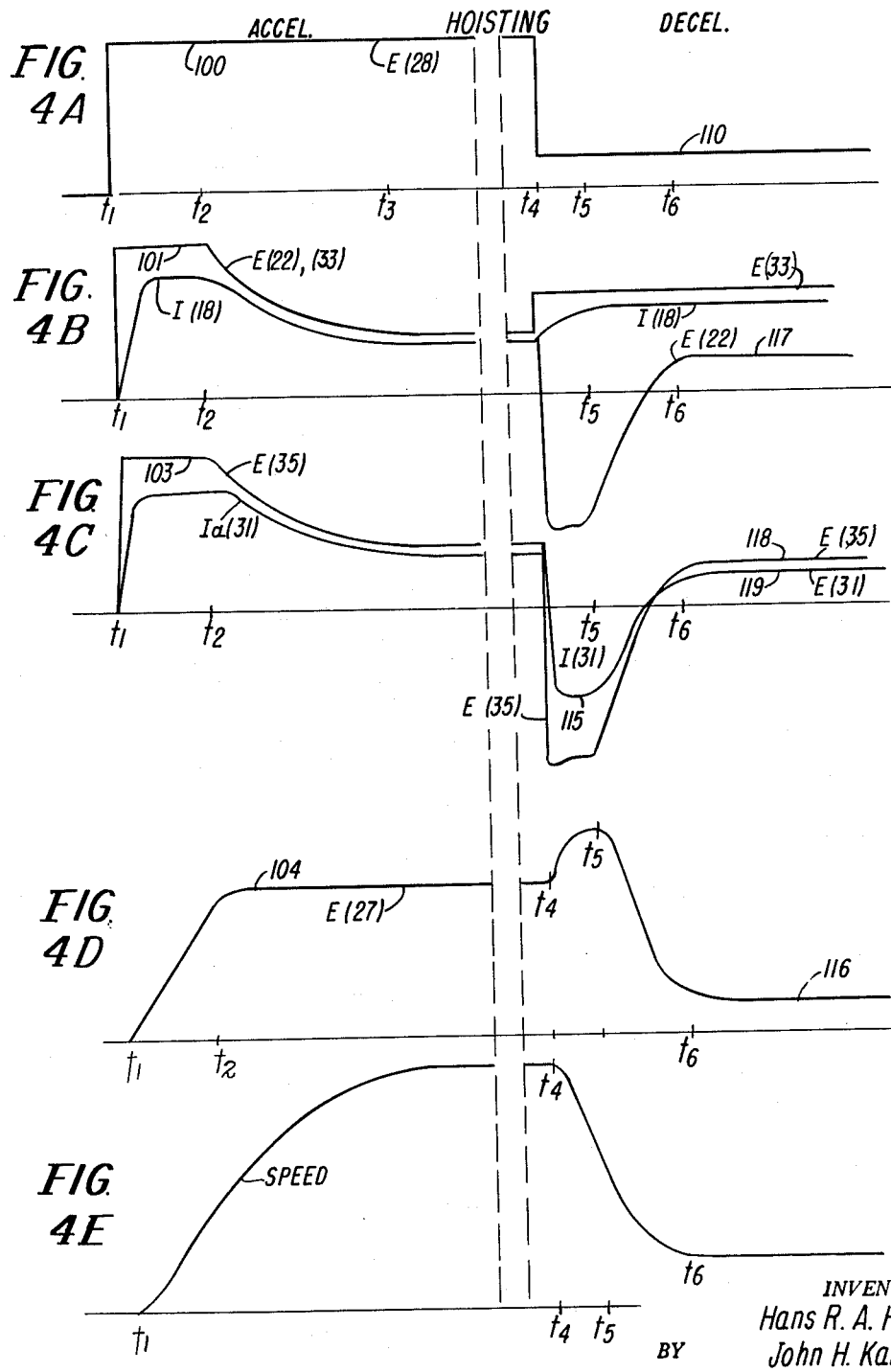

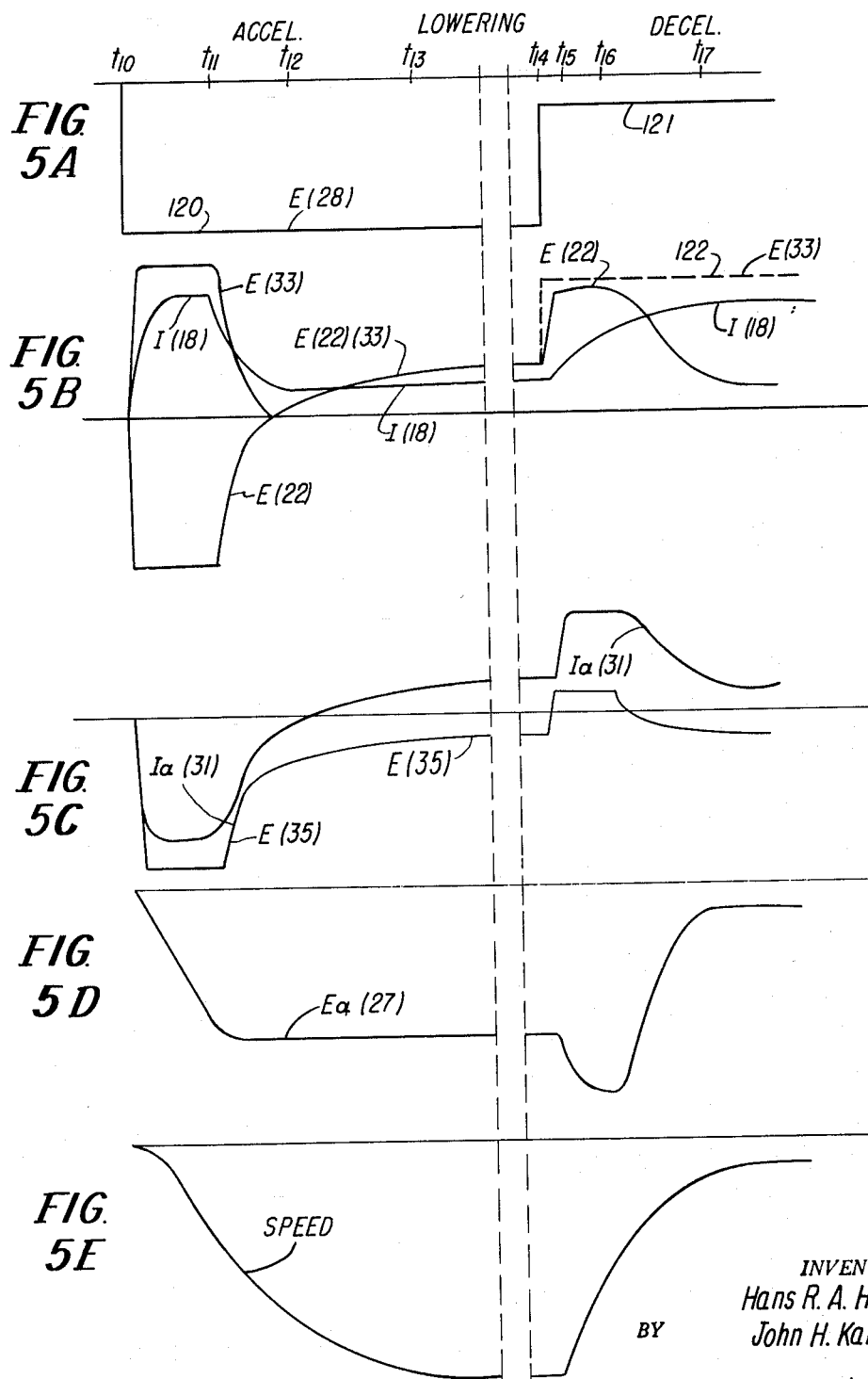

3,093,779
D.C. ADJUSTABLE SPEED HOIST DRIVE WITH MOTOR FIELD CONTROL
Hans R. A. Hansen and John H. Karlson, Milwaukee, Wis., assignors to The Louis Allis Co., Milwaukee, Wis., a corporation of Wisconsin
Filed June 8, 1960, Ser. No. 34,778
8 Claims. (Cl. 318—143)

The present invention relates to direct current motor control systems and particularly to a system for controlling and regulating the speed and torque of a reversible drive, variable speed motors adapted for use with industrial cranes and hoists.

In electromotive power systems of the type used to drive cranes and hoists, series motors have been widely used because of their excellent load torque characteristics. However, such usage is not without reservation because of the necessity of complicated switching requiring heavy current devices in the power circuit. It is to the purpose of providing a hoist control having the desirable characteristics of a series motor without its undesirable characteristics that the present invention is directed.

The torque developed in an electric motor is directly proportional to the field excitation $\theta$ and the armature current $I_a$, torque T may be expressed as:

(1) $$T = k\theta I_a$$

In the direct current series motor, the field winding is connected in series with the armature so that the field excitation current and the motor armature current are the same. Under heavy load conditions the magnetic circuit iron in the motor is saturated, so that the flux changes very little with variations in armature current. In this circumstance $\theta$ becomes constant so that the torque varies directly with the motor armature current.

The speed of an electric motor is considered to be directly proportional to the counter E.M.F. in a motor armature and inversely proportional to the motor excitation or flux. This relationship is expressed:

(2) $$\text{r.p.m.} = \frac{V_a - I_a R_a}{k\theta}$$

where $V_a$ is the armature voltage, $I_a$ is the armature current and $R_a$ is the armature resistance, $k$ is a constant and $\theta$ is a flux. Applying this equation to the series motor arrangement and keeping in mind that the armature current and the field current are identical and the same, it becomes evident that the armature current is a major influence upon actual motor speed in the series motor. Thus, in the circumstance where a series motor is operating with a normal load and at its rated speed, a reduction in load will cause a corresponding lower value in the armature current, the armature voltage drop determined by $I_a R_a$ to decrease, and the flux $\theta$ to be diminished. Accordingly, it is easy to see that in a series motor the motor speed rises as load is diminished. The resulting torque-speed characteristic, which permits high motor speeds at low loads and low but relatively constant speeds for high loads, is very desirable for a hoist because it utilizes the D.C. generator and the prime mover to about full capacity over a very wide load range. However, at lighter loads or in the empty hook condition if the inherent friction in the drive is very small, the motor can sometimes have a tendency to race. Therefore, in the past, when this type of motor has been used in hoists and cranes special precautions sometimes had to be taken in the control circuit when operating at light load or empty hook in order to prevent overspeeding.

Considering this problem of overspeeding further, in the shunt type motor for which the field winding is energized either independently or in parallel with the armature, the speed change between the rated full load condition and the no-load condition varies only slightly. This circumstance develops because the flux remains substantially constant under all load conditions and the counter E.M.F. changes only slightly. Although the series motor characteristic is desirable under high load conditions, the shunt motor characteristic is desirable under low load conditions.

It is a general object of the present invention to provide a new and improved direct current power system having well regulated speed characteristics at both load and no-load conditions and capable of producing the high torque output at full load conditions.

A further object of the present invention is to provide an electromotive power system having well regulated speed characteristics under light load conditions while retaining the advantages of the direct current series motor including good commutation during switching and well regulated speed with high torque characteristics under full load conditions.

Another object of the invention is to provide a motor drive system having the characteristics of a shunt type motor at low speed and very low torque and having the characteristics of a series type motor at other loads.

A specific object of the invention is to provide a new and improved control circuit for a direct current motor of the separately excited shunt type in which at low speed setting and at very low load the field excitation is retained substantially constant and the motor armature current is varied independently thereof, and wherein at high speed and moderate and large loads the field excitation increases with the motor armature current to a saturation level, thereby to provide a direct current motor having well regulated speed characteristics at low speeds and under light load conditions and capable of supplying and regulating substantial amounts of power under heavy load conditions.

Further objects and features of the invention pertain to the particular structure and arrangements whereby the above recited and other objects of the invention are achieved.

The invention, both as to the structure and method of operation, will be better understood by reference to the following specifications and drawings, forming a part wherein:

FIGURE 1 is a schematic representation of a drive control circuit in accordance with the invention;

FIGURE 2 is a schematic representation of still another arrangement employing the principles of the present invention;

FIGURE 3 is a schematic representation of a variation of the arrangement set forth in FIGURE 2;

FIGURES 4A, 4B, 4C, 4D and 4E show operational characteristics of the circuit in accordance with the invention for the circumstance of acceleration and deceleration in the hoisting direction under load; and FIGURES 5A, 5B, 5C, 5D and 5E show operational characteristics of the circuit in accordance with the invention for the circumstance of acceleration and deceleration in the lowering direction under load.

Referring specifically to the arrangement of FIGURE 1, there is shown therein a motor control system 10 of the Ward-Leonard kind including a motor generator set 11 and a control circuit therefor 30. The motor generator set includes a D.C. generator 12 provided with a field winding 14 and a D.C. motor 16 provided with a field winding 18. The armatures of the generator 12 and the motor 16 are connected in a series loop by conductors 19 and 15 joining the brushes 13 of the generator to the brushes 17 of the motor.

The control arrangement 30 includes a first linear amplifier 24, a second linear amplifier 29, a D.C. reference source 25, and a direct current source 36.

The linear amplifier 24 is provided with a first input conductor 27 and a second input conductor 28. A D.C. reference signal from the source 25 is applied via the potentiometer 26 to the second conductor 28. Another signal of a polarity opposite to that provided through the source 25 and corresponding to the armature voltage $E_a$ in the motor generator set 11 as measured at the voltage detector 54 of any suitable type is applied via the conductor 27 to the linear amplifier 24. This amplifier may be magnetic, electronic, semi-conductive or rotating, but in each instance, it must have a reversible and limited (saturated) output. The reversible output feature may be achieved either by selection and design of the amplifier or by effecting a switching therein.

The second linear amplifier 29 is provided with a first input conductor 22 extending directly from the output of the linear amplifier 24, and a second input conductor 31 connected to an armature current detector 55, any suitable type, for providing a signal of an opposite polarity and of a magnitude corresponding to the armature current flow in the motor generator set 11. The output from the second linear amplifier 29 is applied directly to the generator field winding 14 via the conductor 35. The motor field winding 18 is energized directly from a direct current source 36 via a potentiometer 39, a blocking device 38, such as a diode, and conductor 33. In addition, the field winding 18 is also connected at the conductor 33 to output of the linear amplifier 24 via the conductor 32 and a rectifying device 34 of the full wave type. Both devices 38 and 34 are arranged to permit a flow of current only in the direction to the field winding 18.

Considering now the operating functions of the various units employed in the arrangement of FIGURE 1, the first amplifier 24 provides an output signal directly in proportion to the difference signal applied by the input conductor 27 and the input conductor 28. Assuming a condition of balance between the inputs to the conductors 27 and 28, if the voltage signal from the armature applied via the conductor 27 decreases, there will be a difference signal input to the amplifier 24 thereby causing an increase in its output or in the signal applied to the input conductor 22 extending to the linear amplifier 29. This increase is designed to increase the energization to the field generator winding 14 thereby to increase the excitation of the generator 14 and the armature voltage thereof.

Similarly, if there should be a condition of balance and the armature voltage should increase, there would be a difference signal input to the amplifier 24 causing a decrease in the output from the amplifier and a decrease input via the conductor 22 to the amplifier 29. This is directed to decrease the energization to the field winding 14 thereby to decrease the excitation in the generator 12 and the armature voltage thereof.

Any current flow in the armature circuit is detected at the armature current detector 55 and fed back to amplifier 29 via the conductor 31, thereby tending to reduce the output of amplifier 29. Accordingly, there will be a tendency to reduce the output provided to the conductor 35 and the generator field 14 so that the armature voltage will be reduced. The reduction in armature voltage causes a reduction in the signal fed back via conductor 27 to the amplifier 24 thereby creating a greater difference signal between the conductors 28 and 27 and generating a larger output from the amplifier on the conductor 22 to the amplifier 29. Accordingly, the output of the amplifier 24 will tend to increase until its output is enough higher than the armature current feedback signal on the conductor 31 to maintain the armature voltage at its desired level. Because of the signal amplification in the amplifier 29, the actual difference between the output of the amplifier 24 on the conductor 22 and the armature current feedback signal on the conductor 31 will be slight and the output of the amplifier 24 will be effectively proportional to the armature current.

As pointed out above, the motor field winding 18 is energized from a source 36 and also from the output of the first amplifier 24. Normal excitation to the motor field winding 18 is supplied through the direct current source 36 via the potentiometer 39 and the blocking device 38. The output from the blocking device 38 is balanced against the signal 32 as provided through the rectifier 34. It is this signal that provides a base or minimum excitation to the motor field winding 18 which excitation can be varied by adjusting the potentiometer 39 between its extreme ranges. An additional source of excitation to the motor field winding 18 is provided from the output of the first linear amplifier 24 via the conductor 32 and rectifier 34. In the circumstance where the output of the first linear amplifier 24 as it appears at the rectifier 34 is greater than the minimum excitation signal as it appears at the diode 38, conduction through the diode 38 will be blocked and excitation will be supplied to the motor field winding 18 from the linear amplifier 24 via the rectifier 34.

From the foregoing, it is clear that the system set forth in FIGURE 1 describes a separately excited shunt motor circuit when the signal on conductor 32 is less than the output from the device 38. In the circumstance where the amplitude of the output of the first linear amplifier 24 is less than the voltage applied to the diode 38, the amplifier 24 and, accordingly, the series connected amplifier 29 are effective for determining the armature voltage in the motor generator set 10. The amplifier 24 does not in any way affect the motor field excitation in the winding 18. In this circumstance, the motor 16 responds entirely as a separately excited shunt type motor having the well regulated speed characteristics.

However, when the output of the first linear amplifier 24 as it appears at the rectifier 34 exceeds the output of the blocking device 38, the device 38 is rendered nonconductive so that the excitation at the field winding 18 of the motor 17 varies with the magnitude of the output from the first linear amplifier 24. Accordingly, and as this output is proportional to the armature current, the motor excitation and the armature current in the motor 17 varies directly with one another as in a series type motor thereby to provide a motor system that has the same torque speed characteristic as a series motor. While this is a general description of the type of motor operation affected by the circuit, hereinafter detailed consideration is given to the following specific conditions of operation:

Acceleration in the hoisting direction under load;
Deceleration in the hoisting direction under load;
Acceleration in the lowering direction under load; and
Deceleration in the lowering direction under load.

Giving consideration to the operation of the system in the circumstance of hoisting a load, reference is made to FIGURES 4A, 4B, 4C, 4D and 4E. These figures are clearly marked to illustrate operational characteristics of the circuit for the condition of acceleration in the hoisting direction under load and for the condition of deceleration in the hoisting direction under load.

Turning now to the operational characteristics of the circuit for the condition of acceleration under load, the assumption is made that the motor is not operating and that the ganged wipers of the potentiometers 26 and 39 are, at position 0, both disconnected from any source of power. If at the time $t_1$ the wipers of the potentiometers 26 and 39 are moved to the position 1, the motor field winding 18 is provided with minimum enregization via the conductor 46 and the blocking device 38, and the amplifier 24 is provided with a reference signal E(28) via the conductor 28 of an amplitude level 100 as shown in FIGURE 4A. Immediately there appears a large difference input signal at the amplifier 24 between the signal E(28) provided at the conductor 28 and the armature voltage signal $E_a$(27) applied at the input conductor 27. Accordingly, and as shown in FIGURE 4B, the output at E(22) of the amplifier 24 increases rapidly to saturation as shown at level 101 thereby providing a constant maximum reference input to the second amplifier 29 and impressing a constant and full field energization voltage E(33) and current I(18) on the winding 18 through the conductor 32 and the diode 34. The field energization current I(18) suffers a time lag due to time constant of the field winding circuit. In the absence of an armature current signal at the conductor 31, the amplifier 29 is driven in accordance with the signal provided at the input conductor 22. Accordingly, the output E(35) of the amplifier 29 is driven to a level 103 as shown in FIGURE 4C. As a result thereof, the generator 12 is energized at its field winding 14 to provide a maximum armature current $I_a(31)$ as shown in FIGURE 4C so that the motor accelerates under current limit as shown in FIGURE 4E. At the time $t_2$, the armature voltage $E_a(27)$ has built to level 104, as shown in FIGURE 4D, to correspond to the reference signal applied at the input conductor 28. Thereupon the output E(22)(33) of the first amplifier 24 is diminished causing the motor field energization I(18) and the output E(35) of the second amplifier 29 and the armature current $I_a(31)$ to decrease accordingly. The decrease in motor field energization is proportional to the decrease in the armature current so that motor speed increases at a lesser rate, the motor functioning effectively as a series motor until final speed is achieved corresponding to the applied reference signal E(28) to the amplifier 24 and the applied load torque. Thus at time $t_3$ with the reference input E(28) maintained at a level 100, the armature voltage $E_a(27)$ is maximum and corresponds to the applied reference voltage E(28) and the speed of the motor is maximum for the set load and armature voltage condition as shown in FIGURE 4E. Between the time $t_2$ and $t_3$, the output E(22)(33) of the amplifier 24 is reduced from saturation but to a level sufficient to maintain the requisite armature current $I_a(31)$ FIGURE 4C) and motor field energization I(18) to maintain the desired speed for the applied load. Thereafter, it may be desirable to reduce the speed of the hoist in the hoisting direction under load. Reducing the speed to zero or to a lesser speed is effected by substantially the same operation within the circuit.

In order to decelerate hoist from a high speed to a lower speed, or to a standstill, while proceeding in a hoisting direction under load such as at the time $t_4$, the reference signal input E(28) is reduced from a level 100 to a level 110 and the output E(46) to the blocking device 38 is increased by movement of the ganged wipers of potentiometers 26 and 39 to position 5. The change in the input reference signal E(28) causes a large reverse difference signal to be applied to the input of the amplifier 24 so that the output E(22) thereof is as shown in FIGURE 4B, reversed and increased in the negative direction. In this circumstance, and inasmuch as the signal E(46) applied to the blocking device 38 is greater than the signal E(22) so that E(33) corresponds to E(46) and increases the motor field energization I(18) as shown in FIGURE 4B, the motor voltage $E_a(27)$ also increases as shown in FIGURE 4D. At the same time the reversal and change of polarity in the output voltage E(22) of the amplifier 24 causes a corresponding difference signal to the input of the second amplifier 29 thereby reversing the output voltage E(35) in substantially the same amount as the change in the output voltage E(22). Accordingly, the direction of magnetic flux in the armature field winding 14 of the generator 12 is reversed causing a high regeneration armature current in the conductor 19 and establishes a negative current limit condition in the motor. The motor 16 accordingly decelerates in the current limit condition with the armature current $I_a(31)$ at the negative level of 155 as shown in FIGURE 4C with a substantially constant armature voltage $E_a(27)$ and constant motor field energization I(18). This condition persists until approximately the time $t_5$ when the motor speed gets so low that the armature voltage $E_a(27)$ can decrease. Between the interval $t_4$ and $t_5$, the armature voltage $E_a(27)$ is limited by virtue of the time constant of the motor field winding circuit. As the armature voltage $E_a(27)$ begins to approach the lower signal level 116 as shown in FIGURE 4D, corresponding to the reference signal level 110 as shown in FIGURE 4A, the output E(22) of the amplifier 24 rises towards a level 117. At the same time the operation of the amplifier 29 is effected so that the output E(35) rises towards a level 118 and the armature current $I_a(31)$ tends towards a corresponding level 119. This change in operational mode of the circuit continues until a time $t_6$ when an equilibrium is achieved between load, speed and armature current $I_a(31)$.

During operation in the lowering direction under light road condition, motor conditions are substantially the same as described above as in the foredescribed hoisting operations, except that the armature currents and, correspondingly, the outputs E(22) and E(35) of the amplifiers 24 and 29, respectively, are reversed. As the understanding of this operation is an easy application of the foregoing given principles, no specific detailed reference is made to the mode of operation of the control system during lowering operation under light load conditions.

However, giving consideration to the proposition of operating the system so as to lower a heavy load under control, more involved circumstances develop and in that regard reference is made to FIGURES 5A, 5B, 5C, 5D and 5E of the drawings. Considering first the circumstances of accelerating a heavy load in the lowering direction from a standstill and assuming operation of the ganged wipers for the potentiometers 26 and 39 into position 8 so as to increase the reference voltage E(28) to a level 120 as shown in FIGURE 5A, the outputs of amplifiers 24 and 29, that is the voltages E(22) and E(35), respectively, are driven in negative saturation and the armature current $I_a(31)$ is driven to negative current limit. Inasmuch as the signal on the conductor 32 is applied through the rectifier device 34, the voltage E(33) appearing on the conductor 33 extending to the field winding 18 is of a magnitude corresponding to E(33) but of a positive polarity as shown in FIGURE 5B. The motor field energization current I(18) as shown in FIGURE 5B follows the signal E(33) but is slower due to the field time constant of the motor field winding circuit. In this circumstance, the motor proceeds to accelerate at a relatively high rate. The armature voltage $E_a(27)$ follows as shown in FIGURE 5D until a time $t_2$ when the preferred balance is achieved at the amplifier 24 between the applied reference signal E(28) and the armature voltage $E_a(27)$ occurs at the time $t_{11}$. Thereafter the signals E(22), E(33) and E(35) decreases in magnitude with the motor field energization current I(18) following with the rate of acceleration gradually decreasing. Between the time $t_{10}$ and the time $t_{12}$ as shown particularly in FIGURE 5C, armature current has been flowing in the lowering direction thus contributing to acceleration. However, at the time $t_{12}$ armature current flows completely diminished and thereafter begins to flow in the braking direction thereby to cause the motor to act actually as a brake in further decreasing the acceleration of the motor. This deceleration action decreases until finally a constant speed is achieved at a time $t_{13}$ as a result of a condition of equilibrium having been reached between the load, speed, motor armature current $I_a(31)$ and motor field energization current I(18).

Giving consideration now to deceleration of the hoist in the lowering direction under load, it will be noted that the operation is very similar to that as described in regards to acceleration in the hoisting direction with a heavy load. Specifically, and giving consideration to FIGURES 5A, 5B, 5C, 5D and 5E, it will be noted that if at the time $t_{14}$ the level of the reference signal E(28) is changed from 120 to 121 by operating the gang of wipers for the resistors 26 and 39 to position 6, that at the same time the voltage E(33) is increased by virtue of the fact that the voltage selected at the potentiometer 39 has also increased. Accordingly, the voltage E(33) will rise to a level 122 as shown in FIGURE 5B. Thereupon the motor field energization current I(18) tends to increase towards the level established by the voltage E(33). At the same time the output voltage E(22) and E(35) of the amplifiers 24 and 29 are increased and the armature current $I_a(31)$ with it. At this time the armature voltage $E_a(27)$ increases further in the negative direction as shown in FIGURE 5D thereby causing rapid deceleration in the speed of the motor. This deceleration and armature current limit continues by virtue of the long time constant in the motor field circuit until motor speed diminishes at a time $t_{16}$ to a level sufficient to permit the motor armature voltage $E_a(27)$ to also decrease. Accordingly, energization to the amplifiers 24 and 29 begins to diminish and with it the armature field energization provided by voltage E(35) and the motor armature current $I_a(31)$. This decrease continues until a condition of balance is achieved between load, speed and motor field energization I(18) and motor armature current $I_a(31)$ at the time $t_{17}$. Accordingly, the motor decelerates smoothly operating as a series motor to a final speed as determined by the setting of the potentiometers 26 and 39 and the load on the hoist.

Under light load conditions in both the hoisting and lowering directions and under conditions of acceleration and deceleration, the amplifier 24 in the system is not driven so hard as to achieve saturation so that the motor field current I(18) is maintained at the minimum value established by the source 36 and potentiometer 39. In this instance then, the motor 16 operates as a shunt type motor having a substantially constant motor field current independent of the armature current. If for some reason it is preferable to operate the hoist at high speeds under the low load condition, this can be accomplished by weakening the motor field which thereupon increases the motor speed.

It is evident from the foregoing description that to achieve control of the motor in the various load conditions, the different operational directions and at various speeds, control is had by varying the amount of current extended, alternatively, via the potentiometer 39 and diode 38, or via the amplifier 24 and rectifier 34, to the field winding 18, the amount of potential applied to the input conductor 28 of the amplifier 24 and the polarity of the signal applied to the input conductor 28. Specifically, for heavy load conditions, the amount of current or energization to the motor field winding 18 should be relatively high in order to maintain the flux in the motor at a high rate thereby to develop a high torque. Similarly, under light load conditions the energization to the motor field winding 18 should be relatively low in order to limit the amount of flux and accordingly the torque of the motor. Under no load conditions or light load conditions the speed of the motor can be varied inversely to the amount of flux within the motor. Thus by reducing the magnitude of the motor field current I(18), high motor speeds can be achieved.

The direction of motor movement that is in the hoist direction or lowering direction is determined directly in accordance with the polarity of the signal applied to the input conductor 28 of the amplifier 24. Thus, and by way of example, with the direction of the field current applied to the winding 18 fixed, by applying a positive polarity signal to the input conductor 28 of the amplifier 24, the motor is moved in the hoisting direction and with a negative polarity signal applied to the input conductor 28, the motor is moved in the lowering direction. It is clear that by reversing the direction of the current flow through the motor field winding 18, that the motor 16 could be made to move in a hoisting direction in response to a negative signal and could be made to move in a lowering direction in response to a positive polarity signal.

The arrangement of FIGURE 2 is essentially the same as that described in FIGURE 1 except that the output from the rectifier 34 and the output from the diode 38 are fed to an amplifier 48 for controlling energization to the motor field winding 18.

The circuit of FIGURE 3 includes all of the components of FIGURE 2 in the same organization and in addition a connection from the output conductor 35 of the amplifier 29 to the input conductor 47 of the amplifier 44 via a conductor 51 and a biased full wave rectifier 52. This arrangement provides a field weakening control under special control circumstances. Specifically, where a large change in speed is demanded under heavy load conditions and where the motor field is strengthened without corresponding increase in armature current such as during a condition of armature current limit, the feedback path via conductor 51 and biased rectifier 52 serves to provide a signal for diminishing the motor field strength. Thus the shunt type motor characteristic is retained. This conductor 51 and rectifier 52 accomplish a predictable negative feedback control which performs the function of a time constant in the motor field winding circuit. With this feedback control, the time constant may be reduced so as to provide a fast response, yet a stable control system. The rectifier 54 may be of any full wave type so as to transmit all positive polarity and negative polarity signals applied thereto, but it should also be biased so that it provides a feedback signal only when the output exceeds the level of the bias. The bias may be variable.

In view of the foregoing descriptions, it is clear that there has been provided herewith an improved control system for reversible motors particularly adapted for variable load conditions commonly experienced in hoists and cranes. The main advantage of the system is that under light load or no-load conditions or under conditions of sudden load change, the motor responds as a separately excited shunt motor of which type it actually is so that no speed runaway problem ever develops. At the same time, the motor retains its versatility so as to be able to experience high speed variation such as found in series type motors. Under heavy load circumstances, the motor responds almost exactly as a series type motor wherein the motor flux changes proportionately with the armature current, thereby to achieve the desirable torque response characteristic of the series type motor.

Although the invention has been described according to a specific consideration, it is understood that variations and modifications may be made therein by those skilled in the art and it is intended to cover in the appended claims all such variations and modifications as fall within the true spirit and scope of the invention.

What is claimed is:

1. A control system for a direct current armature coupled motor-generator set provided with separately excited field windings, comprising a first amplifier responsive to a difference signal input for providing a corresponding first output signal to excite said motor field winding, a source of first reference signal, means for providing a first feedback signal corresponding to motor armature voltage, means for combining said first reference signal and said first feedback signal so as to provide a difference signal input to said first amplifier, a second amplifier responsive to a difference signal input for providing a second output signal to excite said generator field winding, means for providing a second feedback signal corresponding to motor armature current, means for combining said first output signal and said second feedback signal so as to provide a difference signal input to said second amplifier, whereby said second output signal is varied in accordance with variations in said first output signal and with variations in motor current, and means for maintaining excitation to said motor field winding and excitation to said generator field winding independent for first output signals below a predetermined level.

2. A control system for a direct current armature coupled motor-generator set provided with separately excited field windings, comprising a first linear amplifier having a maximum output signal and being responsive to a difference signal input for providing a first output signal to excite said motor field windings, a source of first reference signal, means for providing a first feedback signal corresponding to motor armature voltage, means for combining said first reference signal and said first feedback signal thereby to provide a difference signal input to said first amplifier, a second linear amplifier responsive to a difference signal input for providing a second output signal to excite said generator field winding, means for providing a second feedback signal corresponding to motor armature current, means for combining said first output signal and said second feedback signal thereby to provide a difference signal input to said second amplifier, whereby said second output signal is varied in accordance with variations in said first output signal and with variations in motor current, and means for maintaining excitation to said motor field winding and excitation to said generator field winding substantially nonproportional for first output signals below a predetermined level.

3. A control system for a direct current armature coupled motor-generator set provided with separately excited field windings, comprising a source of first reference signal, means for providing a first feedback signal corresponding to motor armature voltage, a first differential amplifier capable of providing a maximum output signal and being responsive to the difference between said first reference signal and said first feedback signal for providing a first output signal to excite said motor field windings, means for providing a second feedback signal corresponding to motor armature current, a second differential amplifier responsive to the difference between said first output signal and said second feedback signal for providing a second output signal to excite said generator field windings, whereby said second output signal is varied in accordance with variations in said first output signal and with variations in said motor current, bias means connected to said motor field winding for maintaining minimum field excitation thereat, and rectifier means in connection between the output of said first differential amplifier and said motor field winding to maintain excitation to said motor field amplifier and excitation to said generator field winding proportional for first output signals above the predetermined level established by said bias means.

4. A control system for a direct current armature coupled motor-generator set provided with separately excited field windings, comprising a bipolarity source of first reference signal, means for providing a first feedback signal corresponding to motor armature voltage, a first differential amplifier capable of providing a maximum output signal and being responsive to the difference between said first reference signal and said first feedback signal for providing a first output signal, means for providing a second feedback signal corresponding to motor armature current, a second differential amplifier responsive to the difference between said first output signal and said second feedback signal for providing a second output signal to excite said generator field windings, whereby said second output signal is varied in accordance with variations in said first output signal with variations in said motor current, a unipolarity source of second reference signal, means for varying the magnitude of said second reference signal inversely with the magnitude of said first reference signal, a third amplifier for controlling excitation to said motor field windings, and means for applying to said third amplifier a control signal corresponding to the greater one of said first output signals and said second reference potential.

5. A control system for a direct current armature coupled motor-generator set provided with separately excited field windings, comprising a first amplifier responsive to a difference signal input for providing a corresponding first output signal to excite said motor field winding, a source of first reference signal, means for providing a first feedback signal corresponding to motor armature voltage, means for combining said first reference signal and said first feedback signal thereby to provide a difference signal input to said first amplifier, a second amplifier responsive to a difference signal input for providing a second output signal to excite said generator field winding, means for providing a second feedback signal corresponding to motor armature current, means for combining said first output signal and said second feedback signal thereby to provide a difference signal input to said second amplifier, whereby said second output signal is varied in accordance with variations in said first output signal and with variations in motor current, and means including a biased third amplifier provided with said first output signals for directly controlling excitation to said motor field winding, whereby said motor field excitation is constant below a predetermined level of first output signals.

6. A control system for a direct current armature coupled motor-generator set provided with separately excited field windings, comprising a source producing a first reference signal corresponding to a desired armature voltage, a first differential amplifier balancing said first reference signal with a signal corresponding to said armature voltage, said first amplifier being capable of a limited output, a second differential amplifier balancing the output signal of said first amplifier with a signal corresponding to the armature current, means for applying the output of said second differential amplifier to the generator field winding for exciting said generator field, means controlled in accordance with the output signal of said first amplifier for exciting said motor field winding, and means for maintaining excitation to said motor field winding and excitation to said generator field winding independent for first output signals below a predetermined level.

7. A control system for a direct current armature coupled motor-generator set provided with separately excited field windings, comprising a source producing a first reference signal corresponding to a desired armature voltage, a first differential amplifier balancing said first reference signal with a signal corresponding to said armature voltage, said first amplifier being capable of a limited output, a second differential amplifier balancing the output signal of said first amplifier with a signal corresponding to the armature current, means for applying the output of said second amplifier to said generator field winding for exciting the generator field, a third amplifier controlled in accordance with the output from said first amplifier for providing excitation to said motor field, and means providing a biasing source to said third amplifier for maintaining excitation to said motor field winding substantially constant for output signals from said first amplifier below a predetermined level.

8. A control system for a direct current armature coupled motor-generator set provided with separately excited field windings, comprising a first amplifier responsive to a difference signal input for providing a corresponding first output signal to excite said motor field winding, a source of first reference signal, means for providing a first feedback signal corresponding to motor armature voltage, means for combining said first reference signal and said first feedback signal thereby to provide a difference signal input to said first amplifier, a second amplifier responsive to a difference signal input for providing a second output signal to excite said generator field winding, means for providing a second feedback signal corresponding to motor armature current, means for combining said first output signal and said second feedback signal thereby to provide a difference signal input to said second amplifier, whereby said second output signal is varied in accordance with variations in said first output signal and with variations in said motor current, a unipolar source of second reference signal, means for providing from said source of second reference signal a first control signal of a magnitude varying inversely with the magnitude of said first reference signal, first rectifier means for providing from the output of said first differential amplifier a second control signal of a magnitude corresponding to said first output signal, means for providing a third control signal of a magnitude corresponding to the greater one of said first and second control signals, second rectifier means for providing a fourth control signal corresponding to said second output signal above a predetermined minimum level, a third differential amplifier for controlling excitation to said motor field winding in accordance with the difference signal between said third and fourth control signals, whereby said motor field excitation is limited to a minimum level by said source of second reference signal and is limited to a maximum level by said second output signal and is varied therebetween in accordance with said first output signals.

References Cited in the file of this patent

UNITED STATES PATENTS

| | | |
|---|---|---|
| 2,516,001 | Harding et al. | July 18, 1950 |
| 2,684,458 | Winchester | July 20, 1954 |
| 2,929,975 | Caldwell et al. | Mar. 22, 1960 |